US005691063A

United States Patent [19]

Davis et al.

[11] Patent Number: 5,691,063

[45] Date of Patent: Nov. 25, 1997

[54] LASER IMAGEABLE TUNED OPTICAL CAVITY THIN FILM AND PRINTING PLATE INCORPORATING THE SAME

[75] Inventors: Gregory F. Davis, Guerneville; Richard A. Bradley, Jr., Santa Rosa; Shari Powell Fisher, Santa Rosa; Roger W. Phillips, Santa Rosa, all of Calif.

[73] Assignee: Flex Products, Inc., Santa Rosa, Calif.

[21] Appl. No.: 608,645

[22] Filed: Feb. 29, 1996

[51] Int. Cl.[6] .......... B32B 9/00

[52] U.S. Cl. .......... 428/411.1; 428/195; 428/207; 428/331; 428/333; 428/480; 428/522; 428/689; 428/701; 428/704; 428/913; 430/270; 430/271; 430/273; 430/274; 101/457; 101/463.1; 101/476

[58] Field of Search .......... 428/207, 331, 428/411.1, 480, 522, 195, 913, 701, 704, 694, 689, 332, 333; 430/270, 271, 272, 273, 274, 275; 101/476, 457, 463.1

[56] References Cited

U.S. PATENT DOCUMENTS

| | | | |
|---|---|---|---|
| 5,188,032 | 2/1993 | Lewis et al. | 101/453 |
| 5,192,626 | 3/1993 | Sekiya et al. | 428/694 |
| 5,379,698 | 1/1995 | Nowak et al. | 101/454 |

*Primary Examiner*—Patrick Ryan
*Assistant Examiner*—Abraham Bahta
*Attorney, Agent, or Firm*—Flehr Hohbach Test Albritton & Herbert LLP

[57] ABSTRACT

A laser imageable tuned optical cavity thin film for use with a laser producing laser radiation at a laser wavelength comprising a flexible sheet of plastic having first and second surfaces serving as a film substrate. A thin film stack is disposed on the first surface of the film substrate and comprises a first vacuum-deposited metal layer carried by the first surface. It is also comprised of a dielectric layer deposited on the first metal layer. A second semi-opaque metal layer is vacuum deposited onto the dielectric layer. The thin film stack is tuned to provide maximum absorption at the laser wavelength.

16 Claims, 2 Drawing Sheets

LASER IMAGEABLE TUNED OPTICAL CAVITY THIN FILM AND PRINTING PLATE INCORPORATING THE SAME

This invention relates to a laser imageable tuned optical cavity thin film and a printing plate incorporating the same which has improved writing characteristics using digitized laser radiation.

The traditional printing method of offset lithography is undergoing rapid technological change. The change began when desktop publishing software became commonly used for the graphical layout of printing jobs, replacing camera-ready paste-up pages. Once printers began to receive a majority of their jobs in the form of digital data instead of camera ready art, they began to purchase equipment that could also utilize digital information. This new equipment helped to increase the speed and efficiency of the overall printing process. It has also significantly reduced the volume of chemical solutions consumed by the printing industry by removing the need for photographic film or photopolymer development. The first digital equipment purchases were proofing systems that enabled customers to quickly review a digitally generated hardcopy example before the final printing phase. While digital proofing is still in use, it is increasingly common to proof directly on the computer screen and then proceed to the final printed output produced by a digitally fabricated printing plate.

Current laser imaged printing plate technology is limited by the laser sensitivity of the currently available materials. In use, the printing plate can be imaged directly on the printing press, or in a flatbed scanner. In either case the laser fluence needs to be equal to or above 400 mj/cm$^2$ in order for the plate to be imaged. Due to imperfections in the surface of the plate and the surface it is mounted to, variation in focal depth occur. In order to overcome these variations it is necessary to improve the operating range of the plate imaging system. In co-pending application Ser. No. 08/436,119 filed May 8, 1995, there is disclosed a laser imaged direct-write film and printing member incorporating the same which incorporates a vacuum-deposited laser ablative coating comprised of a single layer formed of a material selected from a group of metals consisting of titanium, zirconium, aluminum, hafnium and alloys thereof. Although such a film and printing member have excellent characteristics, there is still a need to improve the absorptive qualities of such a film and printing member.

In general, it is an object of the present invention to provide a tuned optical cavity thin film and printing plate incorporating the same that has an improved sensitivity for an infrared laser beam.

Another object of the invention is to provide a thin film and printing plate of the above character in which the working focal depth is increased and a sharp image is maintained over the entire printing plate, even though there are variations in laser-to-image distances.

Another object of the invention is to provide a thin film and printing plate of the above character in which the effects of variations in adhesive thickness are minimized due to the increased laser sensitivity of the laser absorbing layer.

Another object of the present invention to provide a thin film and printing plate incorporating the same which has been tuned to maximize absorption at the ablating laser wavelength.

Another object of the invention is to provide a thin film and printing member of the above character which can be readily manufactured.

Additional objects and features of the invention will appear from the following description in which the preferred embodiments are set forth in detail in conjunction with the accompanying drawings.

In general, the laser imageable tuned optical cavity thin film is for use with a laser producing laser radiation and comprises a flexible sheet of plastic having first and second surfaces serving as a substrate. A tuned optical cavity thin film stack is disposed on the first surface of the substrate. The thin film stack comprises a first vacuum-deposited metal layer carried by the first surface. A dielectric layer is deposited on the first metal layer at an odd number of quarter waves at the laser design wavelength. A second vacuum-deposited metal layer is deposited on the dielectric layer. An organic or silicone top coat overlies the second metal layer. The thin film stack is tuned by design of the various layer thicknesses to a maximum absorption at the laser wavelength.

Figure 1:
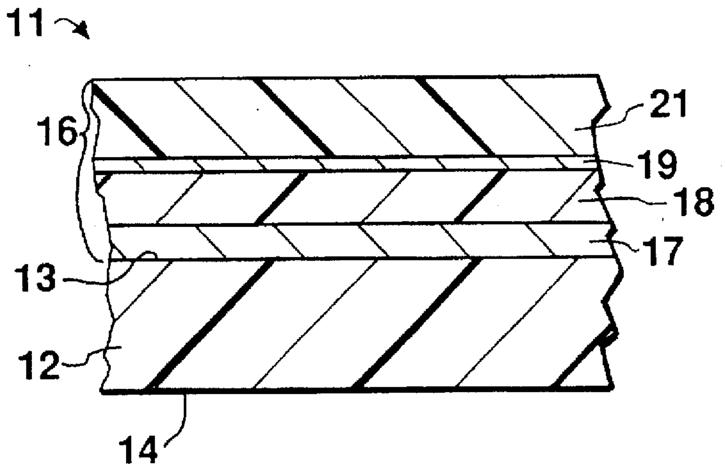
FIG. 1 is a cross-sectional view of a thin film incorporating the present invention showing a thin film stack on a polymer substrate.

More particularly as shown in FIG. 1 of the drawings, the laser imageable tuned optical cavity thin film 11 consists of a flexible sheet or film substrate 12 formed of an organic plastic having first and second surfaces 13 and 14 and having a thickness ranging from 0.2 to 10 mils and preferably 7 mils. The substrate is formed of a suitable material such as clear or barium sulfate filled polyethylene terepthalate (PET), or polyethylene napthalate (PEN), or flexible metal substrates such as aluminum. In the latter case, an evaporative layer of PET or other suitable polymer would be evaporated to mimic the polyester substrate given in the first instance. This construction would eliminate the need for lamination. Films such as MYLAR supplied by Dupont, ICI 442, Hoescht 3930, ICI 329, and ICI Kaladex can be utilized.

A thin film stack 16 is carried by the first surface 13 and can be provided with leaky or non-leaky tuned optical cavities.

When leaky optical cavities are provided, the stack 16 consists of a first partially transmissive reflective metal layer 17 that is vacuum deposited onto the first surface 13. The first metal layer can be formed of a bright metal such as aluminum or a gray metal such as chromium, nickel, or titanium which is to act both as an absorber and a reflector in the design of the present invention. The first metal layer 17 is deposited to a thickness ranging from 65–500 Å so that it is partially absorbing, transmissive, and reflective with the optimum thickness being selected to give the highest FIGURE of merit when heat capacity, thermal conductivity and absorption are considered. The optimum thickness for the first metal layer when titanium is used for that layer is 220 Å.

When a non-leaky cavity is desired for the thin film stack 16, an opaque reflective metal layer such as aluminum, nickel, titanium, or chromium is deposited on the first surface 13 to a thickness ranging from 500–2000 Å to provide the first metal layer 17.

A dielectric layer 18 is deposited on the first metal layer 17 to a thickness which is between one-third and one-fifth of an optical wavelength at the laser wavelength and preferably one-fourth of an optical wavelength at the laser wavelength. The material for the dielectric layer 18 can be selected from the group of magnesium fluoride, aluminum oxide, silicon dioxide, high index oxides, metal fluorides, metal sulfides, thermally evaporated polymers, and vacuum deposited polymers that can be cured in vacuum by in situ polymerization such as thermal, electron beam, or radiation techniques and polymers deposited by chemical vapor deposition. Magnesium fluoride, however, is the preferred material, and evaporative polymers being even more preferable.

A second metal layer 19 is vacuum deposited onto the dielectric layer 18 to a thickness ranging from 25 Å to 100 Å with 65 Å being the optimum thickness. The metal selected for the second metal layer 19 can be the same metal as the first metal layer 17.

An organic top coat 21 is deposited to a thickness from 0.5 to 4 micrometers on the second metal layer 19 and is formed of, but not limited to materials such as a silicone for a waterless plate construction or polyvinyl alcohol for a plate designed to be used with dampening solutions.

In the fabrication of the laser ablation film 11, a roll coater can be utilized in which the film substrate 12 is carried by rollers and passed through a vacuum chamber in the roll coater. The metal layers 17 and 19 and the dielectric layer 18, and the topmost organic layer 21 can be deposited sequentially in the desired order in a single pass. Alternatively, the three layers can be deposited in multiple passes through the roll coater without breaking vacuum.

Alternately, the film substrate 12 carrying the layers 17, 18 and 19 can be removed from the roll coater and the organic top coat 21 then can be applied in a conventional wet process at atmospheric pressure. This can be carried out at the same facility or a different facility with the film substrate 12 in roll form in a roll coating operation. Thus the thin organic coating 21 is applied in a manner well known to those skilled in the art in a wet coating process. Thereafter, the wet coating can be cured by ultraviolet radiation or by thermal heating until the top coat is adhered to the top metal layer 19 and is fully cured.

The top coat 21 is prepared so it has hydrophilic or hydrophobic and oleophilic or oleophobic characteristics with respect to the printing ink or inks to be utilized with the laser imageable film of the present invention. By way of example, the organic coating can be in the form of an oleophobic material such as a silicone polymer that repels ink. Alternatively, it can be in the form of a hydrophilic material such as polyvinyl alcohol which attracts water. This organic top coat 21 can also be characterized as a coating which exhibits an affinity different from that of the thin film substrate 12 for at least one printing liquid selected from the group consisting of ink and an abhesive fluid for ink.

Figure 2:
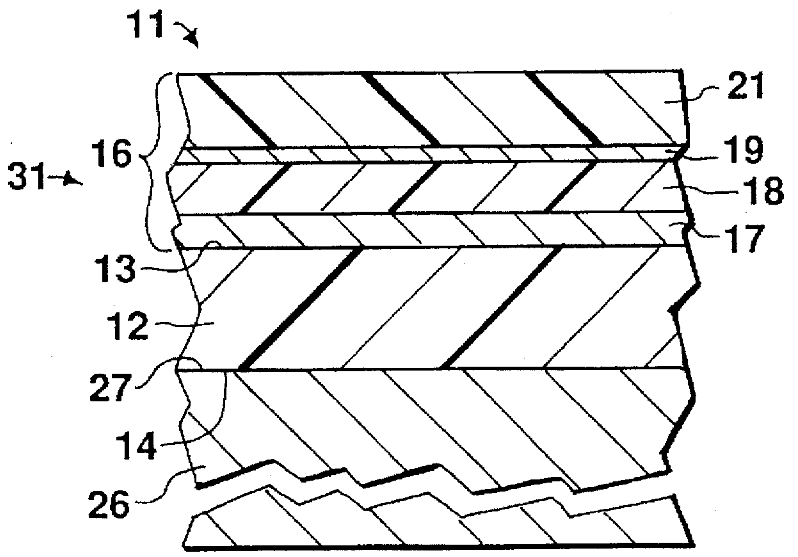
FIG. 2 is a cross-sectional view of a printing plate incorporating the present invention having the tuned optical cavity laser ablation thin film shown in FIG. 1 incorporated therein.

After the cavity laser ablation film 11 has been prepared in the manner herein before described, it can be applied to a supporting substrate or a plate 26 having an upper or first surface 27 to form a laser imageable direct-write printing member 31 as shown in FIG. 2. The film 11 is adhered to the base substrate or plate 26, typically made of aluminum of such a thickness that it is flexible, i.e., 5–12 mils, and can be attached to a cylinder, by suitable means such as an adhesive (not shown) which can be disposed either on the surface 14 or on the surface 27 so that it is secured and laminated in a dimensionally stable configuration on the surface 27 of the base substrate or plate 26. The base substrate or plate 26 preferably should be dimensionally stable so that it will not have a maximum excursion in excess of 5 mils over a length of 20 inches during normal operating temperatures ranging from 50° F. to 100° F.

Figure 3:
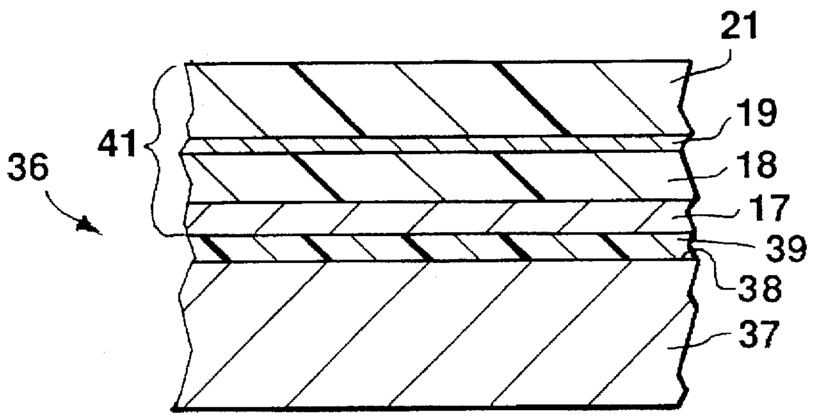
FIG. 3 is a cross-sectional view of another embodiment of a printing plate incorporating the present invention.

Another embodiment of a printing plate incorporating the present invention is shown in FIG. 3 which eliminates the need for a lamination. The printing plate 36 shown in FIG. 3 consists of a flexible metal substrate 37 of a suitable material such as aluminum of a suitable thickness of 5–12 mils and having a surface 38. A polymeric dielectric layer 39 is provided on the surface 38 to a thickness of 0.25–2 mils. This layer 39 can be an evaporative layer of PET and is provided to mimic the function of the substrate 12 in the embodiments shown in FIGS. 1 and 2. The layer 39 has deposited thereon a thin film stack 41 similar to or identical to the thin film stack 16 hereinbefore described.

The composite printing plate or members 11, 31 and 36 as shown in FIGS. 1, 2 and 3, can then be utilized and loaded directly into the printing press to be imaged or into an image setting machine where it can be imaged by infrared diode lasers to create images on the laser ablation film 11. The image creation occurs because of an ablation mechanism. Upon exposure to the infrared laser beam, decomposition or gassification of the first surface 13 of the organic film substrate 12, results in an interfacial degradation between the substrate 12 and the first metal layer 17 in FIG. 2 or the layer 39 and the metal layer 17 in FIG. 3. Wiping the plate with a solvent such as isopropyl alcohol allows removal of the remaining parts of layers 17, 18, 19, and 21 from the imaged areas of the plate.

In the leaky cavity absorber system, the first metal layer 17 is partially transmissive. The polymeric layer 12 is heated by heat transfer from the laser energy absorbing top metal layer 19, through the dielectric layer 18 and through the first metal layer 17, where it is combined with the energy absorbed directly into layer 17, bringing the polymeric layer 12 to its decomposition temperature. The decomposition temperature, as for example 265° C. (538° K.), for PET is below the melting or vaporization temperature of the laser absorbing layers 17, 18 and 19. In the non-leaky cavity absorber system, the majority of the laser light is reflected from the first metal layer 17 and the dielectric used in layer 18 is a polymer. Image creation occurs because an of an ablation mechanism similar to the leaky cavity except the decomposition and gassification occurs in the polymer dielectric layer 18 removing the top metal layer 19. If the polymer dielectric layer is oleophilic and some of the polymer dielectric layer is left behind after the top metal layer 19 is removed, the plate will function in a similar fashion as if the entire stack, layers 17,18, and 19 had been removed. If the polymer dielectric layer 18 is removed along with the topmost metal layer 19 exposing the reflecting layer below, then the reflective layer 17 can act as a hydrophilic layer for attracting a dampening solution, and the topmost organic layer 21 can be an oleophilic polymer. It is advantageous that the laser absorbing layer not melt or vaporize since such a vapor phase transition consumes laser energy without a corresponding temperature rise which would reduce ablation sensitivity. This is a very important consideration because laser diodes typically utilized in such applications operate at lower power outputs.

The laser ablation film 11 has improved laser ablation sensitivity over single metal or carbon matrix absorbing layers and has a higher absorptance at the laser wavelength. This absorptance is achieved by tuning the thin film stack 16 to the laser frequency for a minimum of reflection and a maximum of absorption by appropriately selecting the thickness of the dielectric layer 18, and metal layers 17 and 19.

Figure 4:
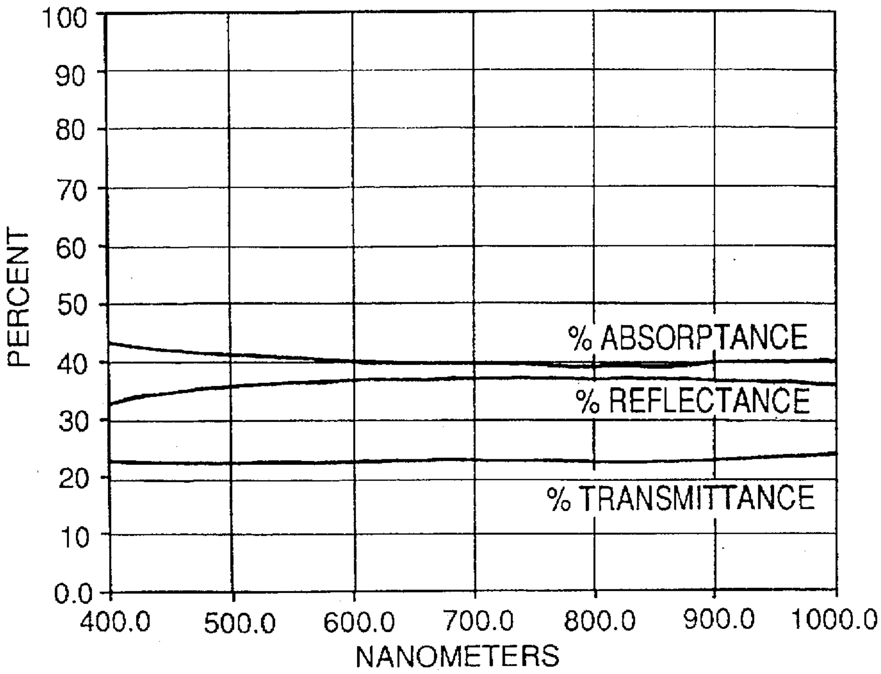
FIG. 4 is a graph showing the optical performance of a single metal layer of titanium where its thickness has been adjusted for maximum absorption at the infrared diode laser wavelength.

FIG. 4 is a graph which shows the calculated absorption that is obtained from a single metal layer of titanium 210 Å thick.

Figure 5:
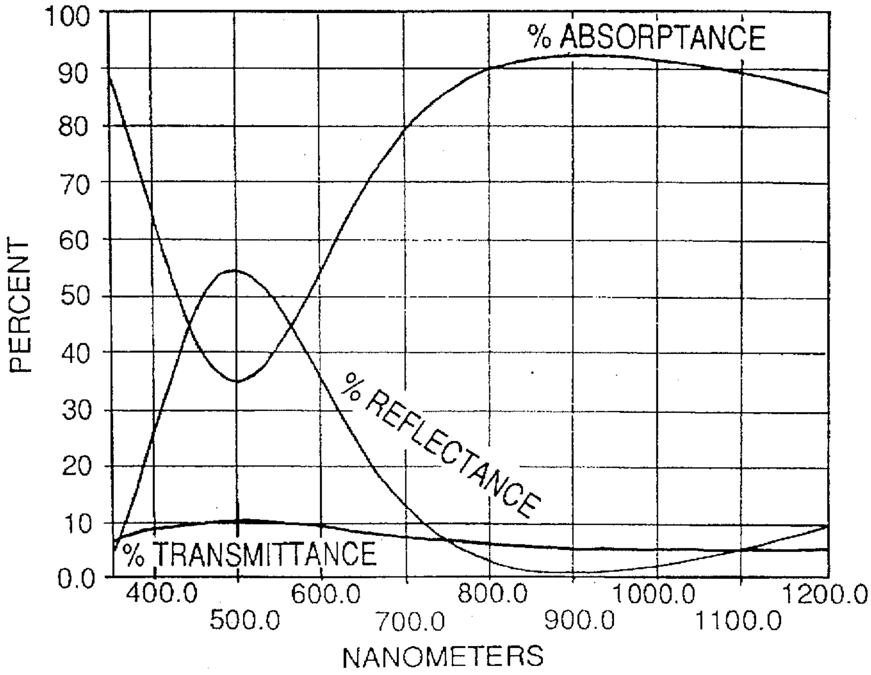
FIG. 5 is a graph showing the optical performance of the film shown in FIG. 1.

FIG. 5 shows the optical performance of the improved specific laser ablation film 11 incorporating the present invention made up of the first metal layer 17 being formed of 220 Å of nickel, the dielectric layer 18 being formed of 1812 Å of magnesium fluoride and the second metal layer 19 being formed of 65 Å of nickel, showing the high absorption which can be obtained with such cavity laser ablation film with the absorption being above 90% from 800 to 1,100 nanometers.

Figure 6:
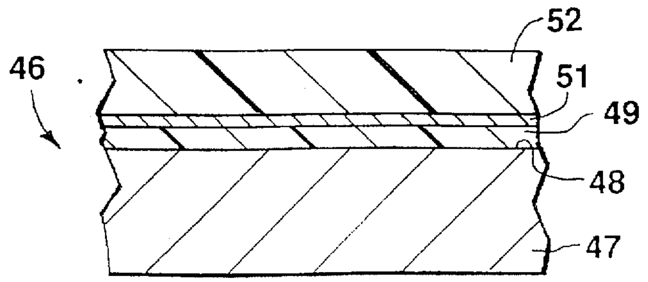
FIG. 6 is a cross-sectional view of another printing plate incorporating the present invention.

In FIG. 6, there is shown a cross-sectional view of another embodiment of a printing plate incorporating the present invention. The adhesive used to laminate the thin film structure 11 to the base supporting structure 26 in FIG. 2 may be eliminated, along with the PET substrate and metal layer 17 and the layers 18, 19 and 21 are then deposited directly onto the base supporting structure 26. Alternatively as shown in FIG. 6, the printing plate 46 consists of a flexible metal substrate 47, as for example, aluminum, of a suitable thickness, as for example, 5–12 mils. The substrate 47 has a surface 48 upon which there is deposited an evaporative polymeric dielectric layer 49 to a thickness which is not limited to between one-third and one-fifth of an optical wavelength at the laser wavelength as in the previous embodiment of the invention. However, it should be deposited to a thickness ranging from 50 to 400 Å. The dielectric layer 49 is covered by an absorbing metal layer 51 which is 25 to 100 Å thick. In this embodiment of the invention, the metal substrate 47 acts as an opaque metal layer of the thin film stack. A top coat or layer 52 overlies the metal layer 51 to complete the thin film coating for the printing plate 46. The layer 52 is formed of an organic or silicone material and can be deposited in vacuum or conventional we chemical deposition processes. This layer 52 thus can serve as an oleophobic or hydrophilic layer in the manner hereinbefore described.

From the foregoing, it can be seen that there has been provided a laser imageable direct-write cavity laser ablation film which has a substantially lower ablation threshold made possible by the tuning of the ablative coating to the frequency of the laser being utilized.

What is claimed:

1. A laser imageable tuned optical cavity thin film for use with a laser producing laser radiation at a laser wavelength comprising a flexible sheet of an organic plastic having first and second surfaces serving as a film substrate and a thin film optical cavity stack disposed on the first surface of the film substrate, said thin film stack comprising a first vacuum-deposited metal layer carried by the first surface, a dielectric layer deposited on the first metal layer and a second vacuum-deposited semi-opaque metal layer deposited onto the dielectric layer, said thin film stack being tuned to provide maximum absorption at the laser wavelength.

2. A film as in claim 1 wherein said dielectric layer has a thickness of an odd number of quarter waves at the laser wavelength.

3. A thin film as in claim 1 wherein said tuned optical cavity is leaky and wherein said first metal layer is partially absorbing, transmissive and reflective.

4. A thin film as in claim 1 wherein said tuned optical cavity is non-leaky and wherein said first metal layer is opaque and reflective.

5. A film as in claim 1 together with an organic top coat carried by the thin film stack.

6. A film as in claim 1 wherein said first and second metal layers are formed of a metal selected from aluminum, chromium, nickel and titanium, zirconium, hafnium, or alloys thereof.

7. A film as in claim 1 wherein said first metal layer has a thickness ranging from 65 to 2000 Å.

8. A film as in claim 7 wherein said second metal layer has a thickness ranging from 25 to 100 Å.

9. A film as in claim 1 wherein said dielectric layer is magnesium fluoride, aluminum oxide, silicon dioxide, high index oxides, metal fluorides, metal sulfides, thermally evaporated polymers, vacuum-deposited polymers that can be cured in vacuum by thermal, electron beam or radiation techniques and or polymers deposited by chemical vapor deposition.

10. A film as in claim 1 wherein said dielectric layer thickness is between one-third of an optical wavelength and one-fifth of an optical wavelength at the laser wavelength.

11. A film as in claim 4 wherein the dielectric consists of a polymeric material.

12. A film as in claim 1 wherein the flexible sheet of an organic plastic is a white film filled with barium sulfate.

13. A film as in claim 1 wherein said film substrate has a thickness ranging from 0.2 to 10 mils.

14. A lithographic laser imageable printing plate for use with a laser producing laser energy at a laser wavelength comprising a base supporting substrate having a first surface and having a thickness ranging from 5 to 20 mils, an ablation film laminated to the first surface, said laser ablation film comprising a flexible sheet of organic plastic having first and second surfaces serving as a film substrate and a thin film optical cavity stack disposed on the first surface of the thin film substrate, said film optical cavity stack comprising a first vacuum-deposited metal layer carried by the first surface of the film substrate, a dielectric layer deposited on the first metal layer and a second vacuum-deposited metal layer deposited on the dielectric layer, said thin film optical cavity stack being tuned for maximum absorption at the laser wavelength.

15. A printing plate as in claim 14 wherein said dielectric layer has a thickness of an odd number of quarter waves at the laser wavelength.

16. A printing plate as in claim 14 wherein the surface of the base supporting substrate acts as the opaque metal layer of the thin film stack to provide a non-leaky printing plate.

* * * * *